United States Patent [19]
Macriss et al.

[11] 4,012,206
[45] Mar. 15, 1977

[54] AIR CLEANING ADSORPTION PROCESS

[75] Inventors: Robert A. Macriss, Deerfield;
William F. Rush, Arlington Heights;
Sanford A. Weil, Chicago, all of Ill.

[73] Assignee: Gas Developments Corporation, Chicago, Ill.

[22] Filed: Oct. 29, 1974

[21] Appl. No.: 518,784

Related U.S. Application Data

[63] Continuation-in-part of Ser. No. 314,400, Dec. 2, 1972, Pat. No. 3,844,737, which is a continuation-in-part of Ser. No. 24,373, March 31, 1970, abandoned.

[52] U.S. Cl. .................................... 55/34; 55/62; 55/73; 55/75; 55/389; 55/390
[51] Int. Cl.² ...................................... B01D 53/06
[58] Field of Search ............................... 55/31–35, 55/62, 73, 75, 388–390; 62/94, 271

[56] References Cited

UNITED STATES PATENTS

| | | | |
|---|---|---|---|
| 3,009,540 | 11/1961 | Munters | 55/34 |
| 3,024,867 | 3/1962 | Milton | 55/389 |
| 3,144,901 | 8/1964 | Meek | 55/390 |
| 3,176,446 | 4/1965 | Siggelin | 55/388 |
| 3,266,973 | 8/1966 | Crowley | 55/75 |
| 3,464,186 | 9/1969 | Hankison et al. | 55/316 |
| 3,555,787 | 1/1971 | Lustig | 55/389 |
| 3,664,095 | 5/1972 | Asker et al. | 55/387 |
| 3,807,149 | 4/1974 | Norback | 55/389 |
| 3,844,737 | 10/1974 | Macriss et al. | 55/390 |

*Primary Examiner*—Bernard Nozick
*Attorney, Agent, or Firm*—Thomas W. Speckman

[57] ABSTRACT

A process for air cleaning by the removal of water and one or more undesirable gases such as $NO_x$, $SO_x$, and $CO_2$ by a continuous atmospheric pressure and low pressure drop system wherein the adsorbent body is a wheel of thin sheets or layers of fibrous material containing about 10 to 90% by weight of a finely divided crystalline molecular sieve material. The process is especially useful for the removal of $NO_2$ from confined areas.

7 Claims, 2 Drawing Figures

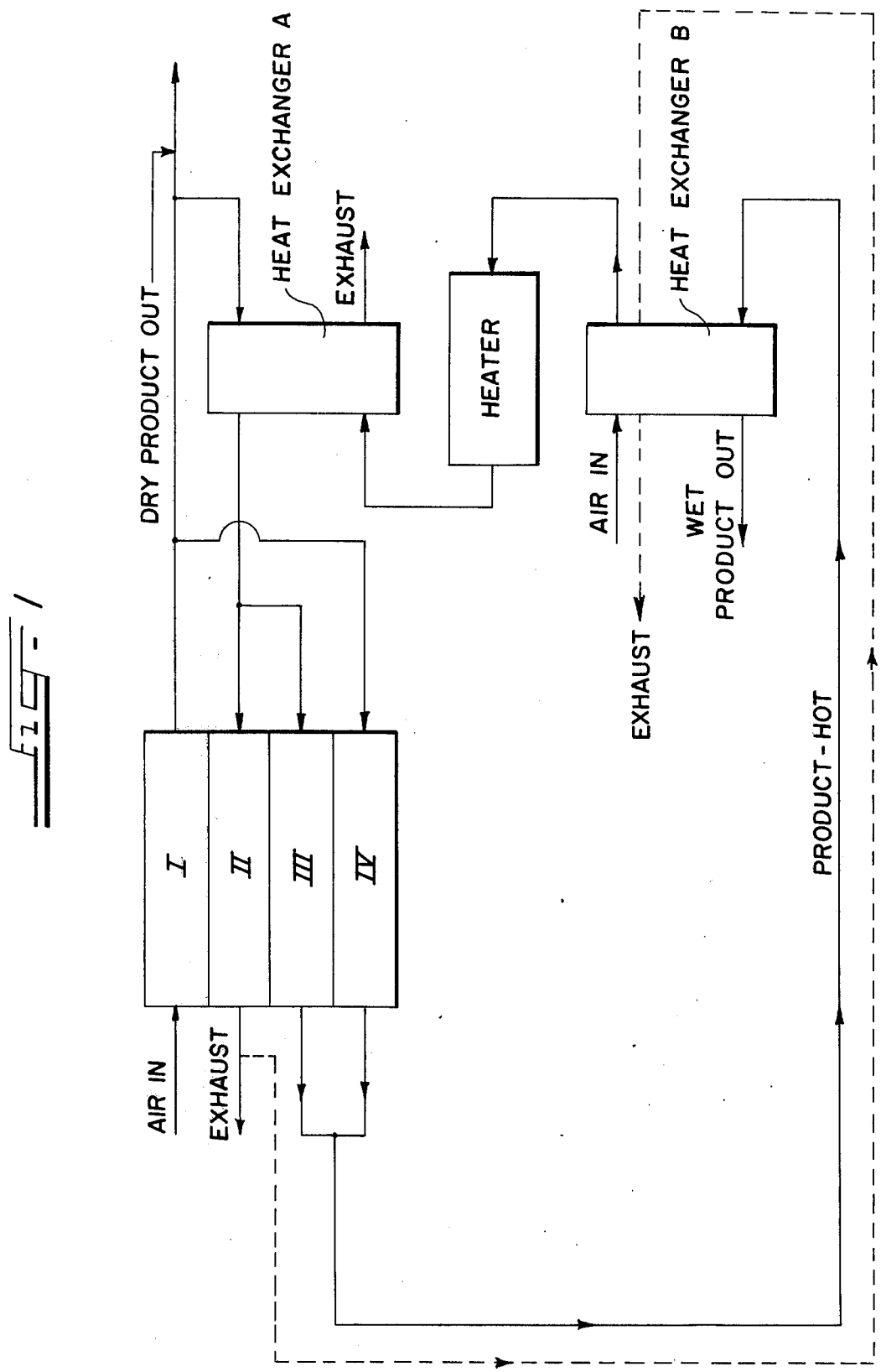

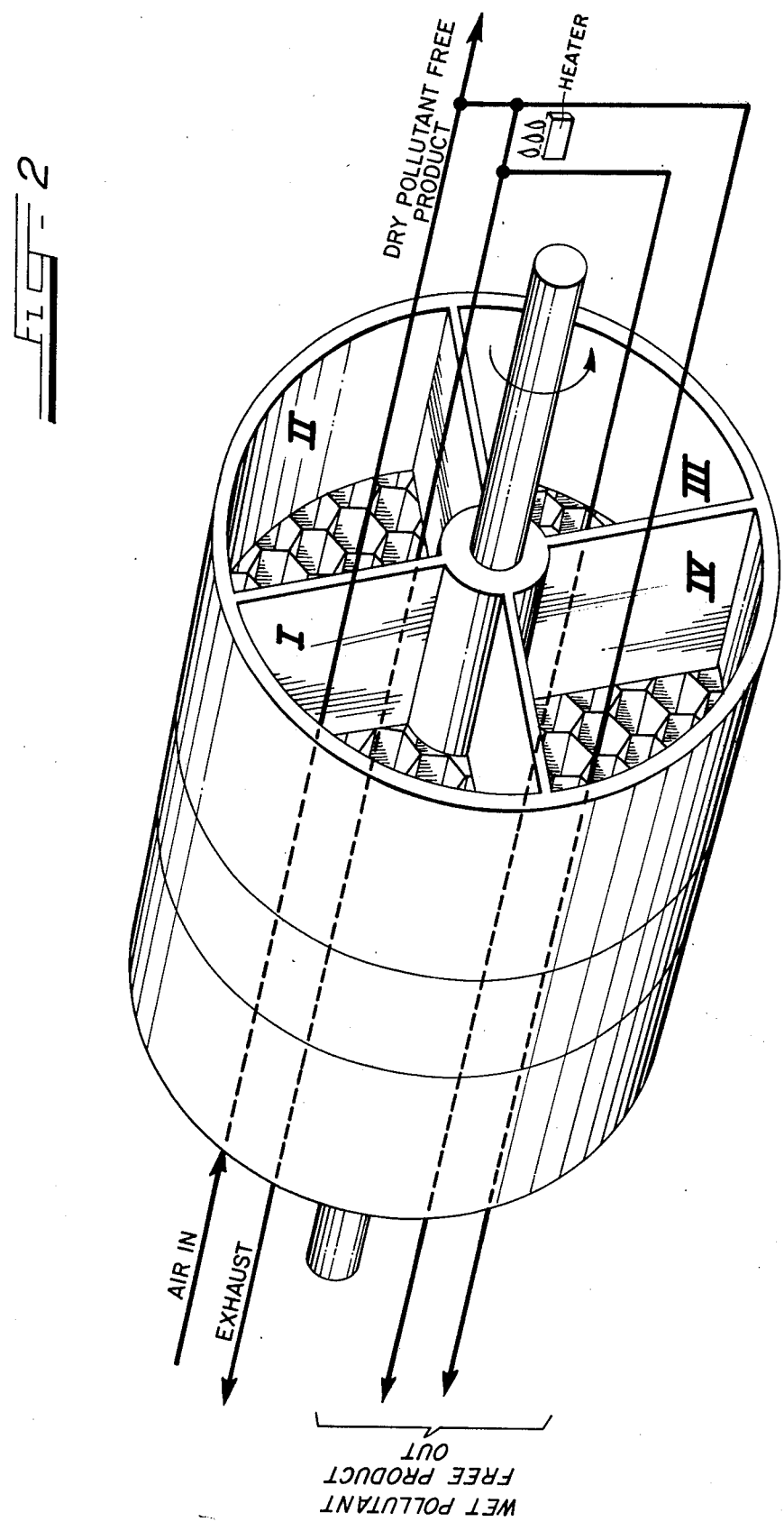

AIR CLEANING ADSORPTION PROCESS

CROSS REFERENCE TO RELATED APPLICATIONS

This application is a continuation-in-part of our co-pending application Ser. No. 314,400 filed Dec. 2, 1972, now U.S. Pat. No. 3,844,737 which was a continuation-in-part of our earlier filed application Ser. No. 24,373 filed Mar. 31, 1970 abandoned.

This invention relates to a process for air cleaning by the removal of water and one or more undesired gaseous components, particularly $NO_x$ including $NO_2$, $SO_x$ and $CO_2$ by a continuous, atmospheric pressure, low pressure drop process and apparatus. This invention is directed principally to home and commercial air cleaning functions and is also applicable to combustion stack cleanup and chemical plant stack cleanup.

There has been an increasing awareness of home pollutants which are principally the gaseous oxides of nitrogen, carbon and sulfur. U.S. Government recognition of $NO_2$ as an undesirable air pollutant has resulted in the setting of standards for ambient air of 0.05 ppm $NO_2$ as an annual arithmetic mean being the maximum acceptable concentration. However, there are frequently areas which exceed these standards by high concentrations of auto exhaust arising from garages and expressways, which result in high concentration of $NO_2$. Likewise, there are frequently areas which exceed desirable amounts of $CO_2$ and $SO_2$ as a result of being near manufacturing facilities which exhaust these gases and as a result of burning of coal. It is desirable to maintain closed volumes, particularly residential, commercial and indoor industrial work areas at below dangerous amounts of these pollutant gases. A process operating at atmospheric pressure and having low pressure drop, energy saving and continuous recycling is desirable to maintain acceptable gaseous concentrations.

Various throw away or regenerable adsorbents have been used for the purification of air. Such materials have included activated carbon, silica gel, activated alumina and activated alumina impregnated with permanganate. However, regeneration of such materials has required high temperatures in some instances and in other instances, the adsorptive capacities have been lower than desired.

Molecular sieves have been known to be far superior in adsorption of the undesired gaseous components than the above mentioned adsorbents. Molecular sieves are well known to have excellent water adsorption capacity and additionally adsorb carbon dioxide, sulfur dioxide and nitrogen dioxide down to extraordinarily low levels. The use of the molecular sieves for such purposes is more fully described in several patents exemplified by U.S. Pat. No. 3,808,773. However, in the prior art processes and apparatus the molecular sieves have been utilized in packed beds. Many serious disadvantages of the packed beds utilizing molecular sieves are pointed out in the 3,808,773 U.S. Pat. Particularly, packed beds have the disadvantage of usually high pressure drop requiring the expenditure of energy to overcome. To obtain a continuous operation, a series of packed beds is required to be cycled since the packed bed must be totally shutdown as far as processing is concerned, to achieve regeneration.

Our earlier filed applications disclose the use of thin sheets or layers of a fibrous material having impregnated therein molecular sieves. The papers thus formed containing the solid adsorbent impregnated during conventional paper manufacturing processes, may then be formed into adsorbent bodies such as wheels, in a manner conventional to the art. Thus, a honeycomb structure is formed through which air may be passed for treatment at atmospheric pressure and with minimum pressure drop. The wheel configuration provides for continuous processing and regeneration of a single unit. Our earlier filed applications teach the extremely high efficiency of water removal from the air and the non-degradation of the desiccant wheel by the products of combustion including $NO_x$ and $SO_x$.

Lithium chloride, one of the most widely prior used regenerable desiccants cannot be used for the removal of $SO_x$ and $NO_x$ from the gases of combustion nor from environmental air. In fact, the lithium chloride desiccants cannot be used in air streams which have been heated by an open flame since the lithium chloride can react with $SO_x$ and $NO_x$ present in a direct heated air stream to form salt such as $Li_2SO_4$ and $LiNO_3$, neither of which function as adsorbents of either moisture or the undesired gaseous pollutants. Lithium chloride, upon decomposition, would present a more serious pollution problem due to emission of hydrochloric acid or chlorine.

The papers containing the solid adsorbent molecular sieves disclosed in our earlier applications, especially in the rotating wheel configuration, have been found very satisfactory in the removal of $SO_x$, $NO_x$ and $CO_2$ from environmental air.

It is an object of this invention to provide an improved process and apparatus for air cleaning, particularly to maintain residential, commercial and industrial indoor work areas at desirable levels of air quality.

It is an object of this invention to provide an improved process and apparatus for air cleaning, particularly to maintain residential, commercial and industrial indoor work areas at desirable levels of air quality.

It is another object of this invention to provide an air cleaning process and apparatus which operates at a low pressure drop.

It is still another object of this invention to provide a process and apparatus for removal of $NO_x$, $SO_x$ and $CO_2$ from environmental air by adsorption on molecular sieves in a continuous and adsorbent regenerable system.

Still other and further objects of this invention will be evident from the description when taken with the drawing wherein, FIG. 1 is a schematic representation of one embodiment of an apparatus for use in the process of this invention; and FIG. 2 is a schematic representation of one embodiment of a rotating adsorption wheel for use in the process and apparatus of this invention.

This invention involves the use of an improved adsorbent system which comprises the use of thin sheets or layers of a fibrous material having impregnated therein from about 1 to 90% and preferably about 10 to 90% by weight of a solid adsorbent comprising finely powdered, solid, crystalline alkali metal or alkaline earth metal alumino-silicates that have the water of hydration removed. Especially suitable is about 25 to 90% by weight of molecular sieve material, about 40 to about 70% being especially preferred. The adsorbent materials particularly useful are crystalline, natural or synthetic zeolites or molecular sieves, and these terms are used interchangeably throughout.

Typical of the fibrous material which may be used is cellulose paper, particularly for fairly low temperature operation at temperatures below about 250° F. Other "papers" which may be used at higher temperatures include papers manufactured of the following types of fibers: asbestos, fiberglass, Teflon, Kel-F, polyamides such as Nylon, polyesters such as Dacron, and mixtures of these fibers. In general, any type of material may be used which can be first formed into fibers, and thereafter by standard paper making processes into a mat of material containing therein and thereon the molecular sieve adsorbent material. This includes not only natural fibers such as cellulose or asbestos materials but also synthetics including plastics such as those mentioned above and other fiber-forming high molecular weight polymer materials. Generically, the Teflon and Kel-F materials are, respectively, polytetrafluoroethylene and polychlorotrifluoroethylene polymers. Some types of Kel-F polymers are also copolymers of vinylidene fluoride with chlorotrifluoroethylene.

The papers thus formed containing the solid adsorbent incorporated during conventional papermanufacturing processes are then formed into desired adsorbent bodies, such as a wheel, in a manner conventional to the art. Generally speaking, zeolites or molecular sieves are well understood to be a type of alkali metal or alkaline earth metal alumino-silicate, and we can use any acid resistant synthetic or natural type material in the apparatus and process of our invention. Natural zeolites include analcite, chabazite, natrolite, permutite, stilbite and heulandite. Typically useful synthetic zeolites are the commercially available molecular sieve materials, such as those designated as types A and X. The synthetic type X are often preferred, particularly 13-X.

The unit cell of the crystalline zeolites useful in this invention have a unit cell chemical formula $(M_{2/n}O)_a \cdot (Al_2O_3)_b \cdot (SiO_2)_c \cdot (H_2O)_d$ where M is a cation of n valence such as sodium, hydrogen or ammonium. The fundamental group in each unit cell, the smallest repetitive entity in the crystalline material, is a tetrahedra of four oxygen anions surrounding a silicon or alumina cation with the metal cation making up the positive charge deficit in each alumina tetrahedra. Acid resistance increases as the silica content increases. Molecular sieves based on mordenite with a silica/alumina ratio of 10/1 (on a mole basis) have chemical and thermal stability to operate in severe environments.

Type 13-X has the unit cell formula $Na_{86}[(AlO_2)_{86}(SiO_2)106] \cdot 276 H_2O$, while the 10-X type has an effective ring diameter of about 8 A. These types have bulk density of about 30 lbs./cu.ft. for powders in the 1–10$\mu$ size range. Zeolon molecular sieves available from Norton Company known as Zeolon Series 100, 200 and 900 are suitable for use in our invention. These are "large port" sieves having the ability to adsorb molecules with critical diameters larger than 5 A. They are available in sodium form and hydrogen exchanged form and have the composition $M_{8/n} \cdot Al_8 \cdot Si_{40} \cdot O_{96} \cdot 24H_2O$ where M is an exchangeable cation having valence $n$. These types have bulk densities about 40.

The adsorbent powders are readily incorporated into the paper during the manufacture thereof by forming a slurry of the paper fibers and the powder in water and depositing the slurry on a screen, which in continuous processes is moving, followed by the conventional steps of water removal transfer of the paper to drying means, and collecting the paper in rolls or other convenient forms. Thereafter, the paper can be processed in a form useful for construction of the adsorbent wheel, as, for example, the formation of a corrugated paper having a thickness and a periodicity within the range of from about 1/16 to ½ inch. A suitable size is a thickness of 1/16 and periodicity of ⅛ inch. Thereafter, the corrugated paper is cut into strips and wrapped around the axle of the wheel in a spiral fashion to the desired wheel diameter. Alternatively the adsorbent-bearing support material may be shaped in a honeycomb form or expanded into shape, as shown in FIG. 2. By the term expanded, we mean the formation of regular or irregular honeycomb shapes by strip-gluing together layers of the adsorbent-bearing paper, in alternating positions for successive layers, followed by lateral opening or expanding the laminate to form the honeycomb apertures between adjacent sheets. The expanded form permits a reduction in the pressure drop in the system, simplification of manufacture and reduction in cost.

Referring to FIG. 1, the adsorbent-regeneration apparatus and process is shown schematically as a four compartmented system. The compartments shown as I, II, III and IV in FIG. 1 may be segments of a rotating adsorbent-bearing wheel for operation involving the simplest ducting and auxiliary equipment. Of course, with proper ducting and valving other compartmented systems may be utilized in the same fashion. The volume of each of the compartments, the thickness and the arcuate segment of a wheel, and the cycle rate such as rotation of the wheel may be readily determined by the desired adsorption and regeneration.

At the start of the cycle, the supported adsorbent in compartment I is cool, dry and has a minimum of adsorbed water and pollutant. The ambient air stream to be cleaned enters compartment I with typical amounts of water vapor and gaseous pollutants. The air stream being treated is first dried, with water accumulating toward the entry side of compartment I. The gaseous pollutant is adsorbed from the air stream depending upon the adsorptive properties of the particular molecular sieve used after the air stream has been dried, with the pollutant accumulating toward the exit end of the supported adsorbent in compartment I. Clean, dry, product air leaves the exit side of the supported adsorbent of compartment I. The ambient air flow through this compartment continues until product air with just more than an acceptable pollutant level exits from compartment I. This may be determined by measurement, but is more frequently designed into the operation of the system by the factors of the pollutant content of the air, volume of the compartment and rate of cycling, such as rotation of a wheel. The supported adsorbent of compartment I at this stage has adsorbed water vapor toward the ambient air entry and adsorbed gaseous pollutants including $SO_2$, $NO_2$ and $CO_2$ toward the product stream exit.

A portion of the clean, dry, product stream is removed from the cycle as product and a portion is directed through a heating means to heat it to more than about 300° F. The heated stream, now a regenerative stream, passes in the opposite direction to the ambient air stream through the portion of the supported adsorbent containing water and gaseous pollutants transferred from compartment I to compartment II. The portion of the supported adsorbent toward the entry of the regenerative stream is heated and the pollutant volatilized and carried by the regenerative stream through the wet section of the supported adsorbent and exits from compartment II as exhaust which contains pollutant levels higher than the ambient and must be discharged as an exhaust stream.

Similarly, when the major portion of the pollutants have been removed from the supported adsorbent in compartment II so that the exit pollutant concentration is acceptable, the supported adsorbent of compartment II moves to compartment III where a similar or less heated or non-heated stream of dry product air leaving compartment I continues to removed water from the supported adsorbent by passing through the adsorbent in the same direction as compartment II. The air stream exits from compartment III as a relatively warm or hot, wet, but pollutant-free air stream which may be utilized both for heat transfer and as a wet, clean product stream. When the regenerative air stream exiting compartment III reaches a temperature of about 120° F., the regenerative entry air stream is replaced by unheated dry product air as shown in FIG. 1 passing through compartment IV.

The flushing regenerative stream passing through compartment IV continues to remove water from the supported adsorbent. The regenerative air stream passing through compartment IV also cools the adsorbent for more efficient adsorbtion in compartment I. The regenerative air stream is maintained through compartment IV until the supported adsorbent in compartment IV is desirably cooled and freed of water. The exit stream from compartment IV may be combined with the exit stream from compartment III, as it is relatively warm, wet, but free from gaseous pollutants.

The supported adsorbent at the end of the cycle of compartment IV is now ready for recycle to compartment I for adsorption of water and gaseous pollutants from ambient air. Thus, it is seen that compartments shown schematically as I, II, III and IV, may be segments of a rotating wheel with appropriate entry and exit ducting. Also, the compartments are referred to here for an aid in explanation and need not be separated volumes, but as in the case of a rotating wheel a continuous, changing state is existant throughout the cycle which merges at least some of the "compartments" into a continuum. From the process standpoint, the compartments referred to may be considered as phases.

The amount of dry product removed from the cycle may be increased by providing a hotter stream to compartment II and therefore, requiring a smaller volume of the dry product to be recirculated.

One desirable exterior ducting scheme is shown in FIG. 1 to result in energy conservation. The hot regeneration streams after passing through the supported adsorbent may be placed in thermal exchange to heat the portion or portions of the dry product stream to be utilized as regeneration streams in compartments II and III. It is also noted from FIG. 1 that the product output may be divided between wet and dry product gas depending upon whether it is desired to optimize dry product or clean product and these may be mixed for room conditioning or passed through further conditioning apparatus such as coolers and humidifiers as desired.

FIG. 1 shows one desirable heat exchange arrangement wherein the exhaust streams are utilized to heat the regeneration streams. The hot product from compartments III and IV is combined and passed through heat exchanger B to heat ambient air which is used in the heating cycle to heat the regeneration streams. Following heat exchange, the stream from compartments III and IV is removed from the cycle as a wet, pollutant-free product. In instances when the exit stream from compartment II is at higher temperatures than that of compartments III and IV, it also may be utilized for heat exchange by passing through heat exchanger B prior to exhausting as shown by the dotted lines in FIG. 1. In the heating cycle as shown in FIG. 1 ambient air is heated in heat exchanger B, passes through a heater which may be of any suitable type to raise the temperature of the air stream sufficiently to provide adequate thermal exchange in heat exchanger A to heat the regeneration stream to compartment II to the desired temperature. The heating cycle air stream is then exhausted or, if desired, may be recycled.

Molecular sieves are known to adsorb the pollutant gases with increasing efficiency at lower temperatures. It is desired that the temperature of the molecular sieves during the adsorptive phase be less than about 200° F. and preferably 150° F. or less. Of course, the practical temperature of the molecular sieves during the pollutant adsorption phase is dependent upon the overall thermal considerations of the entire cycle. Regeneration of the molecular sieves increases in efficiency at higher temperatures. Regeneration with the initial phases at temperatures above about 230° F. is desirable and regeneration at temperatures of about 250° to 350° F. is preferred. Higher regeneration temperatures may be used when the overall thermal considerations permit.

EXAMPLE I

Using an apparatus as generally illustrated in FIG. 1, 400 cubic feet per minute of ambient air at 75° F. having absolute humidity of 0.01 pound per pound of ambient air and 0.5 pound per minute of $NO_2$ is fed to compartment I to be processed. The air leaving compartment I is about 125° F., dry and containing less than 0.05 ppm of $NO_2$. Approximately one-third of this clean and dry air stream is delivered through a heater and is heated to about 275° F. A portion of the exit stream from the heater is passed through compartment II countercurrent to the process stream passing through compartment I. The clean heated air stream passing through compartment II removes substantially all of the adsorbed $NO_2$ from the supported adsorbent together with approximately 35% of the adsorbed water. The exit air stream from compartment II may be utilized for heat recovery prior to exhausting if its temperature is high. The regeneration stream supplied to compartment III differs from that shown in FIG. 1 in that it is dry product air without external heating. In this example, the stream is sufficiently heated in compartment III by the hot supported adsorbent prior to reaching the water containing volumes. The regeneration stream through compartment IV is likewise a portion of the dry product stream. The streams leaving compartments III and IV have an average temperature of 150° F., an absolute humidity of 0.01 lb/lb and less than 0.05 ppm $NO_2$. The cycle is now complete, compartment IV being recycled as compartment I.

Conventional heat exchangers are used as heat exchangers A and B recovering a portion of the heat of the exit streams of compartments III and IV and possibly II to heat the regeneration stream for passage to compartment II.

The wet product stream and the dry product stream may be directly mixed or delivered to a closed volume, such as a restaurant, directly, or if desired, after being passed through a thermal air conditioner and/or humidifier.

EXAMPLE II

The same apparatus as described in Example I is utilized with the ambient air input at 80° F., absolute humidity of 0.017 lb/lb and 0.5 ppm $NO_2$. The treated air leaves compartment I at 165° F., dry and with less than 0.05 ppm $NO_2$. One-third of this clean product stream is heated to 315° F. and passed through compartment II removing substantially all of the adsorbed $NO_2$ and approximately one-third of the adsorbed moisture. A second third of the clean product stream is heated to 295° F. or alternatively, 28% is heated to 315° F., and passed through compartment III. Up to the remaining portion of the dry product air stream is passed through compartment IV. The exit streams from compartments III and IV have an average temperature of 220° F., an absolute humidity of 0.017 lb/lb and less than 0.05 ppm $NO_2$. This combined clean stream after cooling, is delivered to the closed volume desired to be conditioned.

From the foregoing description and examples it is seen that our process is for air cleaning by the removal of water and one or more undesired gaseous components selected from the group consisting of $NO_x$, $SO_x$ and $CO_2$ by a continuous, atmospheric pressure and low pressure drop process having the steps: continuously passing air to be treated through an adsorbent body consisting essentially of thin sheets or layers of fibrous material containing about 10 to about 90% by weight of a finely divided crystalline molecular sieve material for a time sufficient to permit the molecular sieve material to adsorb the $NO_x$, $SO_x$ and $CO_2$ from said air to an acceptable pollutant level and removing dry and clean product air in a first phase and regenerating said adsorbent body by continuously passing countercurrent to the treatment air through said adsorbent body in a second phase a portion of the dry and clean product air heated to a temperature of more than about 300° F. removing the pollutants from said adsorptive body and then passing a portion of the dry and clean product air countercurrently through said adsorbent body in a third phase until the desired amount of moisture is removed and the adsorbent body cooled for recycle of the adsorbent body to the first phase.

Likewise, the apparatus of our invention is an air cleaning apparatus including a rotatable adsorption wheel, means for passing air to be processsed in one direction through said wheel, means for passing regeneration air through said wheel countercurrent to said air to be processed and heater means for heating a portion of said regeneration air, the improvement in said adsorption wheel having an apertured support material containing a finely powdered crystalline molecular sieve material in an amount of about 10 to about 90% by weight on a dry basis, said support material being selected from the group consisting of cellulosics, glass fibers, asbestos fibers, synthetic plastic fibers and mixtures thereof.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for air cleaning by the removal of water and one or more undesired gaseous components selected from the group consisting of $NO_x$, $SO_x$ and $CO_2$ by a continuously adsorbing and regenerating of the adsorbent body, atmospheric pressure and low pressure drop process comprising the steps:

continuously passing air to be treated through an adsorbent body consisting essentially of thin sheets or layers of fibrous material containing about 10% to about 90% by weight of a finely divided crystalline molecular sieve material for a time sufficient to permit the molecular sieve material to adsorb the $NO_x$, $SO_x$ and $CO_2$ from said air to an acceptable pollutant level and removing dry and clean product air in a first phase; and regenerating said adsorbent body by continuously passing countercurrent to the treatment air through said adsorbent body in a second phase a portion of the dry and clean product air heated to a temperature of more than about 300° F. removing the pollutants from said adsorptive body and then passing a portion of the dry and clean product air countercurrently through said adsorbent body in a third phase until the desired amount of moisture is removed and the adorbent body cooled for recycle of the adsorbent body to the first phase.

2. The process of claim 1 wherein the regeneration stream after passing through said adsorbent body is used to provide heat to said portion of the dry and clean product stream used as a regeneration stream in said second phase.

3. The process of claim 1 wherein said paper material comprises fibers selected from the group consisting of cellulosic fibers, asbestos fibers, glass fibers, synthetic plastic fibers, and mixtures thereof.

4. The process of claim 3 wherein said synthetic plastic fibers are selected from the group consisting of nylon fibers, polyester fibers, polytetrafluoroethylene fibers, poly-chlorotrifluoroethylene fibers, copolymers of tetrafluoroethylene or chlorotrifluoroethylene with vinylidene fluoride and mixtures of said fibers.

5. The process of claim 1 wherein said adsorbent body is a continuously rotating wheel comprising paper impregnated with said crystalline molecular sieve material forming apertures for passing air through said wheel from one side to the other.

6. The process of claim 5 wherein said crystalline molecular sieve material is incorporated into the paper during the manufacture of said paper in an amount of about 25 to 90% by weight of the finished paper material in a dry condition.

7. The process of claim 6 wherein said molecular sieve material is incorporated into said paper in an amount of about 40 to 70% by weight.

* * * * *